US009626583B2

(12) United States Patent
Burger et al.

(10) Patent No.: US 9,626,583 B2
(45) Date of Patent: Apr. 18, 2017

(54) AUTOMATED EPITHELIAL NUCLEI SEGMENTATION FOR COMPUTATIONAL DISEASE DETECTION ALGORITHMS

(71) Applicant: University of Pittsburgh—Of the Commonwealth System of Higher Education, Pittsburgh, PA (US)

(72) Inventors: Virginia M. Burger, Boston, MA (US); Srinivas C. Chennubhotla, Pittsburgh, PA (US)

(73) Assignee: University of Pittsburg—Of the Commonwealth System of Higher Education, Pittsburgh, PA (US)

(*) Notice: Subject to any disclaimer, the term of this patent is extended or adjusted under 35 U.S.C. 154(b) by 0 days.

(21) Appl. No.: 14/568,900

(22) Filed: Dec. 12, 2014

(65) Prior Publication Data

US 2015/0169985 A1    Jun. 18, 2015

Related U.S. Application Data

(60) Provisional application No. 61/915,234, filed on Dec. 12, 2013.

(51) Int. Cl.
| | | |
|---|---|---|
| *G06K 9/46* | (2006.01) | |
| *G06T 7/00* | (2017.01) | |
| *G06K 9/00* | (2006.01) | |
| *G06K 9/20* | (2006.01) | |
| *G06K 9/62* | (2006.01) | |

(52) U.S. Cl.
CPC .......... *G06K 9/4638* (2013.01); *G06T 7/0081* (2013.01); *G06T 7/0087* (2013.01); *G06K 9/00134* (2013.01); *G06K 9/2018* (2013.01); *G06K 9/4604* (2013.01);
(Continued)

(58) Field of Classification Search
CPC ............ G06K 9/4638; G06K 9/00134; G06K 9/2018; G06K 9/4604; G06K 9/52; G06K 9/6257; G06T 2207/20148; G06T 2207/30024; G06T 7/0012; G06T 7/0081; G06T 7/0087
See application file for complete search history.

(56) References Cited

U.S. PATENT DOCUMENTS

| | | | |
|---|---|---|---|
| 2005/0272073 A1 | 12/2005 | Vaisberg et al. | |
| 2013/0230230 A1* | 9/2013 | Ajemba | G06T 7/0012 382/133 |

FOREIGN PATENT DOCUMENTS

| | | |
|---|---|---|
| GB | 2478593 A | 9/2011 |
| WO | 2004099773 A1 | 11/2004 |
| WO | 2013148485 A2 | 10/2013 |

OTHER PUBLICATIONS

International Search Report, Mailed Mar. 3, 2015.
(Continued)

*Primary Examiner* — Tom Y Lu
(74) *Attorney, Agent, or Firm* — Eckert Seamans Cherin & Mellott, LLC; Philip E. Levy

(57) ABSTRACT

In aspects, the subject innovation can comprise systems and methods capable of automatically labeling cell nuclei (e.g., epithelial nuclei) in tissue images containing multiple cell types. The enhancements to standard nuclei segmentation algorithms of the subject innovation can enable cell type specific analysis of nuclei, which has recently been shown to reveal novel disease biomarkers and improve diagnostic accuracy of computational disease classification models.

20 Claims, 8 Drawing Sheets

(52) U.S. Cl.
CPC .. *G06K 9/6257* (2013.01); *G06T 2207/20148* (2013.01); *G06T 2207/30024* (2013.01)

(56) References Cited

OTHER PUBLICATIONS

Nogueira, P. et al., 'A multi-layered segmentation method for nucleus detection in highly clustered microscopy imaging: A practical application and validation using human U2OS cytoplasm—nucleus translocation images', [Viewed on internet on Mar. 2, 2015] <URL: http://link.springer.com/article/10.1007/s10462-013-9415-x>, Jul. 11, 2013 See e.g. sections 3 and 4.

Fasanella KE, Bista RK, Staton K, Rizvi S, Shao C, Sepulveda A, Brand RE, McGrath K, and Liu Y. "Nuclear nano-architecture markers of gastric cardia and upper squamous esophagus detect esophageal cancer field effect." J Cancer, 4(8):626-634, 2013. 1.

J. Kwak, S. Hewitt, S. Sinha, R. Bhargava. "Multimodal microscopy for automated histologic analysis of prostate cancer." BMC Cancer 2011, 11. 62.

Andrew H. Beck, Ankur R. Sangoi, Samuel Leung, Robert J. Marinelli, Torsten O. Nielsen, Marc J. Van De Vijver, Robert B. West, Matt Van De Rijn, and Daphne Koller. "Systematic analysis of breast cancer morphology uncovers stromal features associated with survival." Science Translational Medicine, 3 (108):108ra113, 2011. 1, 1.

Linder N, Konsti, Turkki R, Rahtu E, Lundin M, Nordling S, Haglund C, Ahonen T, Pietikainen M, Lundin J. "Identification of tumor epithelium and stroma in tissue microarrays using texture analysis." Diagn Pathol. Mar. 2, 2012;7:22. doi:10.118611746-1596-7-22.

Laurinavicius A, Laurinaviciene A, Ostapenko V, Jarmalaite S, and Lazutka J. "Immunohistochemistry profiles of breast ductal carcinoma: factor analysis of digital image analysis data." DiagnPathol. Mar. 16, 2012;7:27. doi:10.1186/1746-1596-7-27.

Virginia Burger and Chakra Chennubhotla. "Automated epithelial nuclei segmentation to detect nanoscale precancerous perturbations in Barrett's esophagus tissue." Journal of Latex Class Files, vol. 11, No. 4, Dec. 2012.

* cited by examiner putative nuclei trunk/branches through nuclei putative cell boundaries

AUTOMATED EPITHELIAL NUCLEI SEGMENTATION FOR COMPUTATIONAL DISEASE DETECTION ALGORITHMS

CROSS REFERENCE TO RELATED APPLICATIONS

This application claims the benefit of U.S. Provisional Patent application Ser. No. 61/915,234 entitled Automated Epithelial Nuclei Segmentation for Computation Disease Detection Algorithms and filed on Dec. 12, 2013, the entirety of which is incorporated by reference herein.

NOTICE ON GOVERNMENT FUNDING

This invention was made with government support under grant #CA164433 awarded by the National Institutes of Health. The government has certain rights in the invention.

BACKGROUND

Computational models for disease diagnosis and prognosis applied in a clinical setting can provide unbiased reasoning to assist diagnosis of ambiguous cases, save time by filtering out obvious cases, and help establish degree of disease risk for individual patients. A key component of computational models is identification of nuclei in cell images, on which biomarkers can be measured and related to disease risk. While pathologists have traditionally analyzed nuclei from different cell types according to different criteria, and recent computational findings have uncovered the diagnostic strength of certain cell classes, few automated algorithms exist for categorizing nuclei according to cell-type.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In aspects, the subject innovation can comprise systems and methods capable of automatically labeling cell nuclei (e.g., epithelial nuclei) in tissue images containing multiple cell types. The enhancements to standard nuclei segmentation algorithms of the subject innovation can enable cell type specific analysis of nuclei, which has recently been shown to reveal novel disease biomarkers and improve diagnostic accuracy of computational disease classification models.

In various embodiments, the subject innovation can comprise a method that facilitates automatic labeling of cell nuclei. Such a method may include the acts of receiving an image comprising a plurality of cells and fitting a Gaussian mixture model to an intensity distribution of the image. The model can comprise one or more Gaussian distributions and a background distribution. The model can further include the acts of identifying a first Gaussian component Gg associated with a first Gaussian distribution of the one or more Gaussian distributions corresponding to nuclei of the plurality of cells and defining a nuclei mask as a binary matrix based at least in part on the first Gaussian component Gg. In one embodiment, the nuclei mask can comprise one or more putative nuclei associated with the plurality of cells. Embodiment of the method may include cleaning the nuclei mask, contrast normalizing the nuclei mask, breaking one or more large regions of the nuclei mask into individual nuclei, removing one or more very small regions from the nuclei mask, and expanding at least one of the one or more putative nuclei via a watershed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
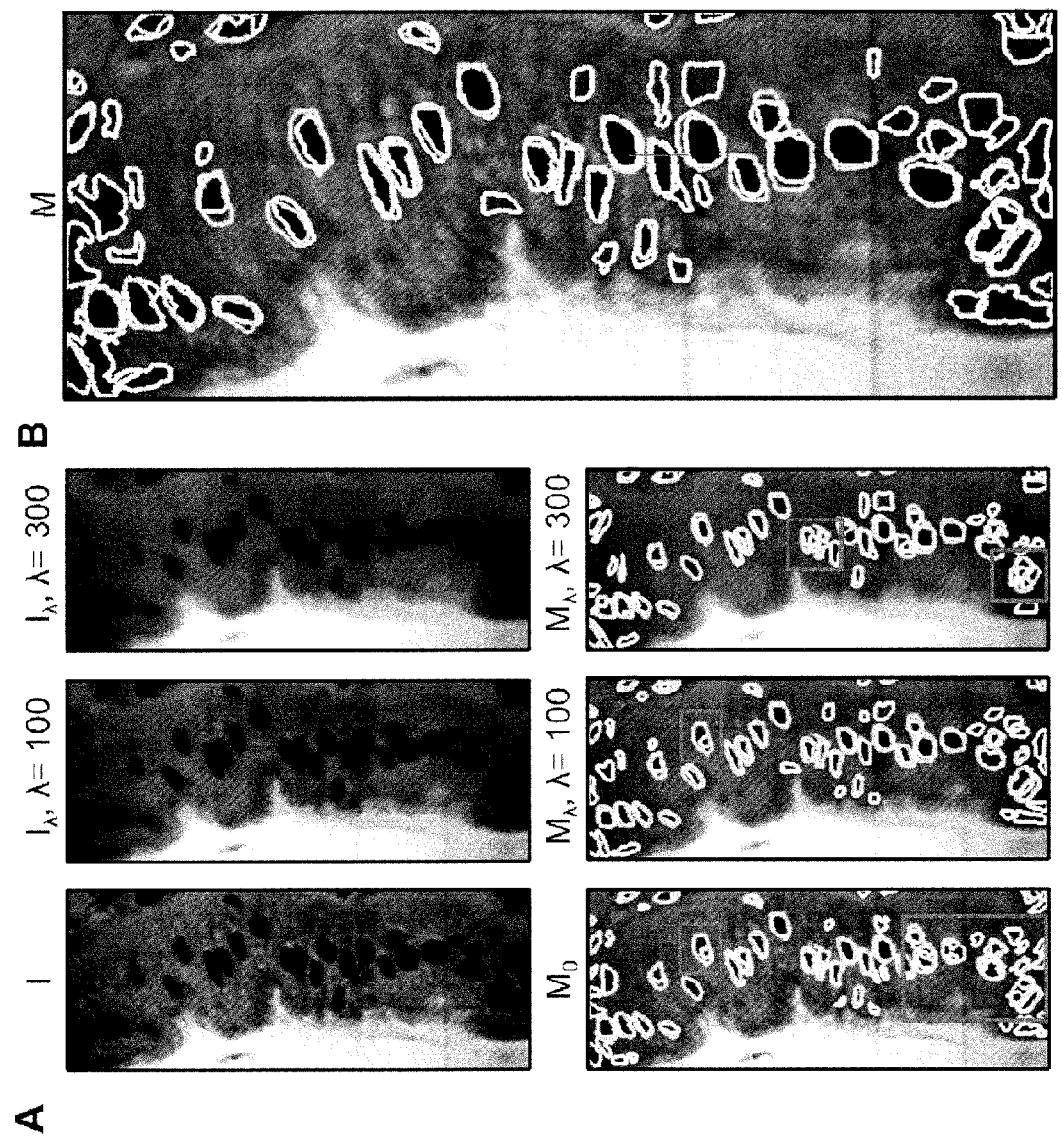
FIG. 1 illustrates image denoising and nuclei segmentation according to aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various embodiments of the subject innovation can employ an automated algorithm which can identify epithelial nuclei in esophageal biopsy sample images. Predictions of image pixels belonging to nuclei using the novel nuclei segmentation algorithm of the subject innovation can be employed in connection with esophageal tissue in various embodiments. Next, an optimal labeling of all image pixels as belonging to epithelial nuclei, other nuclei, or background, is discussed wherein each tissue image is modeled as a Markov Random Field (MRF) on putative nuclei. The MRF can incorporate context-based features describing epithelial nuclei. The features disclosed herein were selected under pathologists guidance and parameterized on the training data set. The techniques of the subject innovation was able to identify 97% of nuclei within the data set, and correctly labeled over 90% of those nuclei as epithelial or non-epithelial. The automated epithelial nuclei detector produces a higher quality selection of epithelial nuclei than manual detection, resulting in more accurate biomarker quantification. To establish its utility in a clinical setting, a nano-scale biomarker measured on predicted epithelial nuclei is shown in results discussed herein to vary significantly between Barrett's esophagus patients with three grades of precancerous changes. The ability to measure cell-type specific biomarkers gained through this algorithm can aid identification of novel disease biomarkers and strengthen existing algorithms for computational disease detection.

Methods

Epithelial segmentation according to aspects of the subject innovation can proceed in two phases. In phase one, putative nuclei can be identified in the image. The nuclei method as used for an example data set is outlined below. This nuclei method was designed to obtain accurate nuclei with respect to ground-truth nuclei boundaries. This nuclei method does not seek to minimize the number of false positives (tissue regions mistaken for nuclei), but instead tries to maximize the number of true positives, as the epithelial classification algorithm in phase two is able to identify most false positives, but can suffer when epithelial nuclei are missing from epithelial chains, making global information incorrect. In phase two, nuclei can be labeled as belonging to epithelial or non-epithelial cells using a conditional Markov random field (MRF).

Phase I: Nuclei Segmentation

Phase one can involve a nuclei segmentation method that can identify putative nuclei in stained tissue images. While different image sets/techniques (e.g., staining, magnification, cell-type, etc.) may require different parameters or perhaps additional steps, the basic method can accurately identify nuclei in several tissue image data sets. Consider segmenting the nuclei shown in the top left image (labeled I) of FIG. 1, which illustrates image denoising and nuclei segmentation in accordance with aspects of the subject innovation. While many nuclei in the image labeled I can be easily identified as black circles, the nuclei on the top left are tightly clustered and hard to resolve, and some nuclei near the bottom right have weaker intensities than the majority of the nuclei. Additionally, there are several dark regions in the image that could be mistaken for nuclei, while they are actually simply variations in cytoplasm/lumen intensity. Some nuclei can also have intensity variations, causing oversegmentation of the nuclei into several smaller nuclei. These intensity variations can have biological explanations, such as chromosome location within nuclei, but can sometimes also be due to equipment/experimental error.

First, to reduce intensity variations in cytoplasm regions that can be mistaken for nuclei and variations in nuclei regions leading to oversegmentation, the image I is denoised using total-variance denoising with a range of smoothing factors ($\lambda$) to form the denoised image $I^\lambda$ (e.g., the images in FIG. 1 labeled $I_\lambda$ with $\lambda=100$ and $300$). Total variation denoising can minimize the total variation with respect to the true signal $x_i$ and the observed signal $y_i$ at pixel i, $|x_i-y_i|$, such that the true values of neighboring pixels are close, where the distance between true values of neighboring pixels i and j is given by $(x_i-x_j)^2$. The smoothing factor $\lambda$ can control how much weight is given to the total variation term, that is, how much more or less important is the variation of the true signal from the observed signal than the closeness of the true values of neighboring pixels. The denoised solution can be found by optimizing $\min_x \Sigma_{ij}(x_i-x_j)^2+\lambda\Sigma_i|x_i-y_i|$. Using Chin's implementation, built on the fast Laplacian solver, this step can be completed in nearly linear time. Second, an intensity range corresponding to nuclei can be identified for the image. As intensities can vary between tissue images due to staining methods and biological factors, a specific intensity range for nuclei for a given system is not specified. Instead, for each image, one or more Gaussian components can be fit to the distribution of intensities within the image. These can correspond to nuclei, cytoplasm, and stroma/lumen. This removes the need for normalizing all images in the data set to the same background intensity, thus avoiding normalization artifacts. Additionally, this allows this algorithm to be ported between many systems and tissue types without having to reparametrize intensity thresholds. On each smoothed image $I^\lambda$, the following steps can be performed: (1) a gaussian mixture model can be fit to the image's intensity distribution with a plurality of (e.g., three, etc.) gaussians (which can correspond to nuclei, cytoplasm, lumen/stroma) and a background distribution; (2) using intensities and region sizes of the pixels described by each Gaussian component, the gaussian $G_g$ component that most likely corresponds to nuclei can be identified; and (3) the nuclei mask $M^\lambda$ can be defined as a $(n_x \times n_y)$ binary matrix, where $M^\lambda(x, y)=1$ if pixel (x, y) is accounted for by at least r % by Gg, and 0 otherwise. The cutoff r was empirically set to be 0.45·maximal percent that a pixel is accounted for by $G_g$ in results presented herein, although greater or lesser values can be used in various aspects of the subject innovation.

Third, at this point, $M^\lambda$ is equal to one for any pixel that may be part of a nucleus. Each connected component in $M^\lambda$ can be considered a putative nucleus. However, $M^\lambda$ may contain many large connected regions that are actually made up of several closely neighboring nuclei, and it may be missing pixels that belong to nuclei that were not captured by $G_g$, e.g., lighter intensity pixels inside nuclei due to intensity variations. The next few steps work to break up large regions into individual nuclei and smooth out nuclei boundaries:

(1) The mask $M^\lambda$ can be cleaned up by removing holes and isolated/bridge pixels;

(2) The mask can be contrast normalized, which can be helpful in finding individual nuclei in large regions;

(3) Thin lines of pixels included in the nuclei mask, which are often caused by "wrinkles" in cytoplasm, can be removed;

(4) Large regions can be subjected to further processing to break them into individual nuclei.

Step four can involve several sub-steps. First, an average size of putative nuclei can be found at this point by determining the median nucleus radius $r_{med}$ and setting $A_{med} = \pi r_{med}^2$. An upper bound can be set for large regions as any putative nucleus with an area greater than a first constant times $A_{med}$; a first constant of 1.75 was used in results discussed herein and was determined empirically, but in various aspects, greater or lesser values can be used. This bound will cause many nuclei of reasonable size to be included in the group of large regions, but if they are sufficiently uniform in intensity, they will be returned unchanged to the set of putative nuclei after the following steps. Additionally, some statistics on shape (such as eccentricity and convexity) can be computed and applied in various aspects to determine reasonable bounds on nucleus shape.

A second sub-step can involve removing any large region with very high intensity (light in color), by requiring that the darkest pixel in large regions must be at least as dark as the median intensity pixel in small regions.

A third sub-step can be applied wherein, on each large region, anisotropic diffusion can be iteratively performed followed by contrast normalization and thresholding, until the region has been broken into multiple regions. The new regions can be added to the set of large regions, if they are also larger than the first constant multiple of $A_{med}$, or added to the set of putative nuclei. If a large region does not break into multiple regions, but is of reasonable shape and size, it can also be added to the set of putative nuclei, and otherwise discarded.

Finally, at this point, the large regions will all have been broken into smaller regions or deemed to be of reasonable shape and size. The parameters for size ($A_{med}$) and shape can be updated using the revised set of putative nuclei, and the following steps can be performed: (1) very small regions can be removed, defined by any putative nucleus with size less than a second constant (with value between 0 and 1) times $A_{med}$ (as used in connection with results presented herein, the size threshold was $$\frac{A_{med}}{3}$$);

and (2) each putative nucleus can be expanded using a watershed to smooth out nuclei boundaries.

Figure 2:
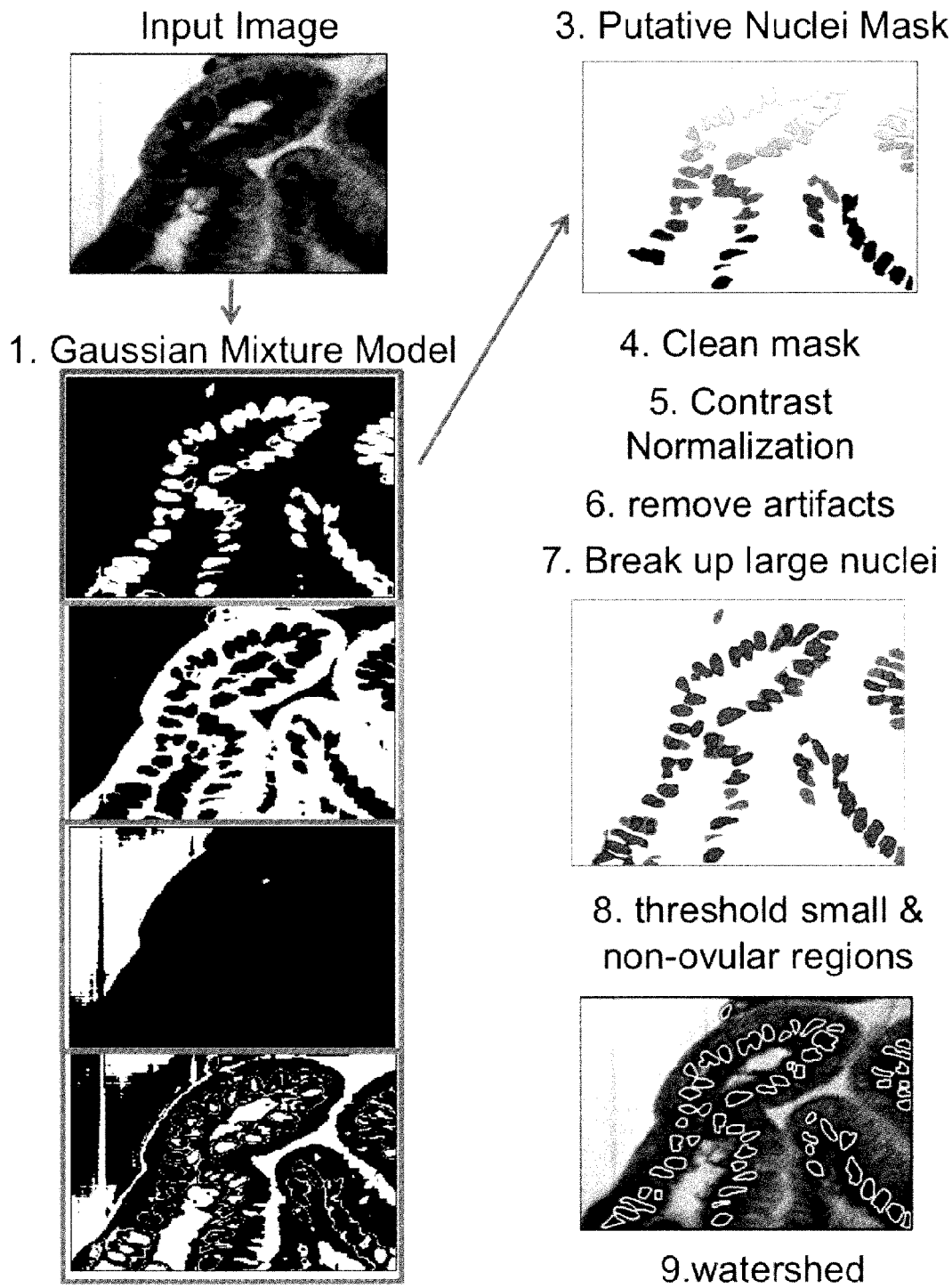
FIG. 2 illustrates an overview of nuclei segmentation in accordance with aspects of the subject innovation.

FIG. 2 shows an overview of nuclei segmentation in accordance with aspects of the subject innovation. In step 1, a mixture of three Gaussians and a background distribution can be fit to the image. Each of the four boxed images corresponds to one of the distributions (maroon corresponds to the background distribution), where white pixels indicate pixels that are most accounted for by that distribution. The green-boxed distribution was automatically identified to correspond to the nuclei, based on the size and shape of its connected components. A mask of putative nuclei can be formed from pixels accounted for by this distribution in step 3. Here, each color indicates a putative nucleus. Note that some of the putative nuclei actually correspond to several closely neighboring nuclei, and must be further processed in steps 4-7. After step 7, the initial putative nucleus mask is shown in red, and the processed large nuclei are replaced by blue nuclei. Steps 8 can filter out particles that are lacking typical characteristics of nuclei, and step 9 can smooth nuclei boundaries using watershed.

This method yields a putative nucleus mask, $M^\lambda$ for each smoothed image $M^\lambda$ (such as the examples seen in the bottom row of FIG. 1A). These masks can be combined so that each pixel can be assigned to the largest putative nucleus across all $\lambda$ at that pixel, to yield a final putative nucleus mask M, such as the example seen in FIG. 1B. The putative nuclei at this point may contain regions that are not actually nuclei, but the second phase of the algorithm can identify these regions as non-epithelial components. Thus, phase one emphasizes having a high True Positive rate, with less concern about achieving a low False Positive Rate. In the bottom row of FIG. 1A, nuclei segmentations according to aspects of the subject innovation are shown in yellow, with ground-truth segmentation shown in cyan. Red boxes indicate nuclei that were incorrectly segmented for each $\lambda$. In FIG. 1B, ground-truth segmentation is again shown in cyan, with merged nuclei segmentation shown in white.

Nuclei Segmentation GUI for Manual Epithelial Classification:

To compare automated epithelial classification with manual epithelial selection, a MatLab GUI was built which allowed a user to hand-pick putative nuclei as epithelial nuclei for phase analysis. As visualization of the putative nuclei boundaries are distracting and can bias the user, the GUI displayed only the raw tissue image. The user could click on a point in the image within a nucleus to select that nucleus. If the nucleus was part of the putative nucleus set, the GUI displayed the boundaries of the putative nucleus at that point. If the nucleus was not part of the set, the GUI used watershed to compute a nucleus at that point and displayed its boundaries to the user. The GUI then allowed the user to grow or shrink the nucleus, merge two nuclei, or split a predicted nucleus into two nuclei. These actions were all performed using steps from the nuclei segmentation algorithm described above. Additionally, the user could hand-trace a nucleus boundary if unsatisfied with the predicted nucleus at that point.

Phase II: Epithelial Classification

Pathologists use context information, in addition to nuclei descriptors, to identify epithelial nuclei in images. For example, while epithelial nuclei in a particular type of tissue are known to have a certain radius, e.g. $\approx 10 \mu m$ in esophagus epithelium, many other nuclei can have this same size. The location of a nucleus with respect to other nuclei and tissue structures complements this information, allowing pathologists to determine specifically which nuclei make up the epithelium. To analogously combine intrinsic and context information while identifying nuclei, the subject innovation can employ a Markov Random Field (MRF) that can encode unary and binary classifiers.

Unary Classifier:

Unary classifiers give the probability that a nucleus is epithelial, independent of the labels of its neighboring nuclei. A total of 94 features were measured on each putative nucleus, and a classifier was built using AdaBoost to label each putative nucleus with a probability of being epithelial. The feature sets includes descriptors measured on isolated nuclei, such as size, intensity, and convexity, as well as features dependent on the environment, such as distance to cell boundary or next closest nucleus. Used independently, each classifier was only weakly predictive. AdaBoost was used with MatLab's default parameters (binary classifier, learning rate of 1, 100 learners) to combine the set of 94 weak classifiers into a stronger classifier, $\psi: \vec{x} \in \mathbb{R}^{94} \to [0,1] \subset \mathbb{R}$, where $\vec{x}$ is the feature vector for nucleus x.

Pairwise Classifier:

Pairwise classifiers give the probability that a nucleus is epithelial, conditioned on the label (epithelial or non-epithelial) of each of its neighbors. Pathologists use many contextual clues to classify nuclei, e.g. epithelial nuclei tend to form a chain along a lumen region, neighboring epithelial nuclei have similar orientations to the lumen, and size/shape of neighboring epithelial nuclei are similar.

Figure 3:
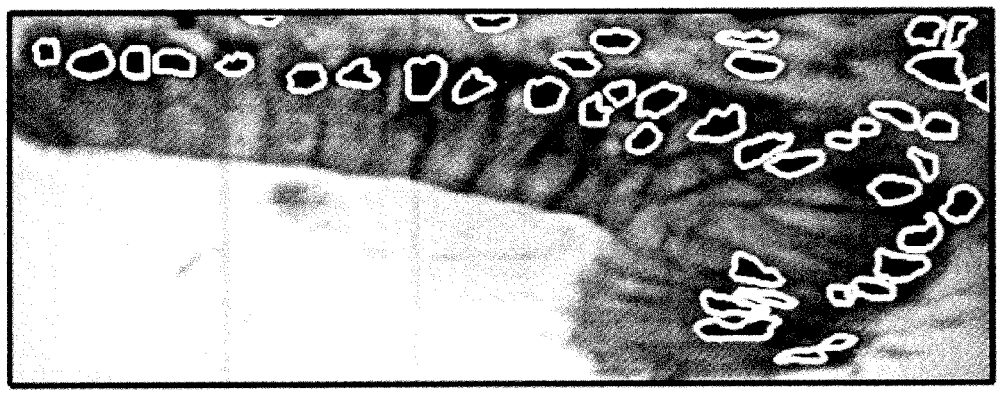
FIG. 3 illustrates identification of putative nuclei, modeling with a trunk and branches, and putative cell boundaries in accordance with aspects of the subject innovation.
Figure 3:
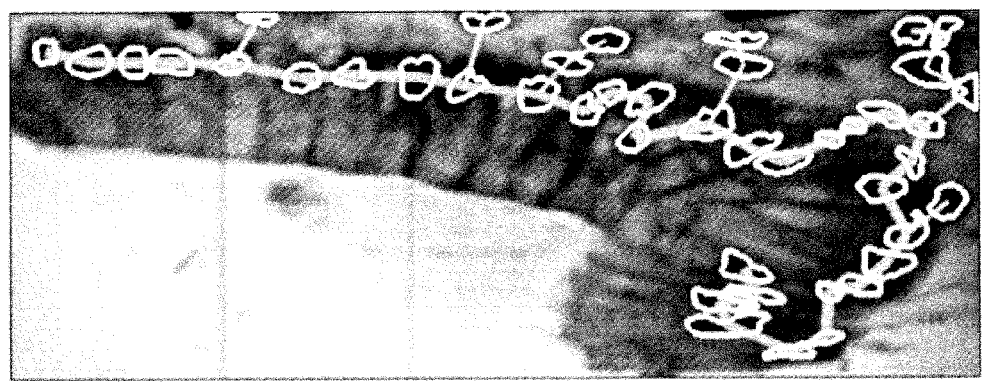
Figure 3:
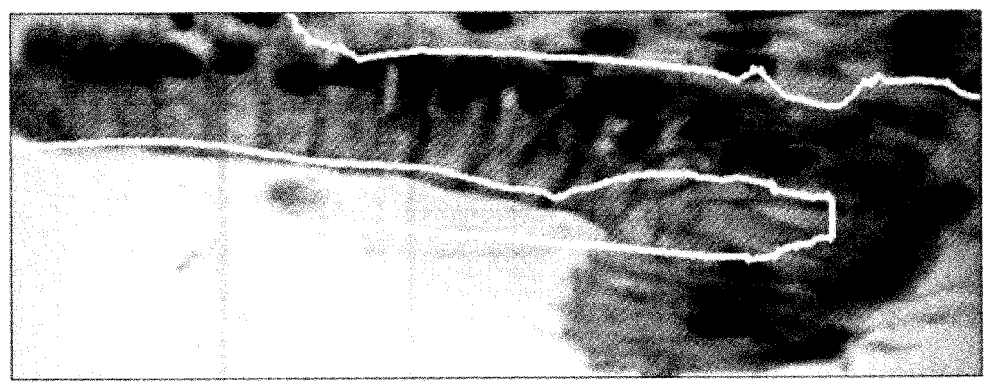

Epithelial Classification:

Initially, a set of $n_p$ features encoding such contextual clues were measured on all pairs of nearby nuclei, where the threshold for "nearby" was set to be a function of the median distance between nuclei within an image. However, due to the randomness of individual nuclei, these pair-wise features alone could not distinguish pairs of same-class nuclei from pairs of mixed-class nuclei (epithelial & epithelial, non-epithelial & non-epithelial, or epithelial & non-epithelial). Thus, to encode more global image information, the tissue architecture within the image was captured in terms of a) location of epithelial cell boundaries and b) arrangement of nuclei in a "tree", with the longest chain of nuclei making up the trunk, as seen in FIG. 3, which shows identification of putative nuclei, modeling with a trunk and branches, and putative cell boundaries. In Phase I, putative nuclei can be predicted. The second row shows a trunk (green) with branches (cyan) built to model the nucleus architecture. The bottom row shows results from a Canny Edge detector that can capture epithelial cell boundaries. These tissue architecture features encode the contextual clues used by pathologists: chains of nuclei (described by the "tree trunk") along the lumen border (described by the epithelial cell boundaries).

The nuclei pairs were then divided into eight architecture-categories according to their location with respect to the epithelial cell boundaries and their position on the nucleus tree. To find the tree, a greedy algorithm was used which initiated a trunk at the nucleus with highest unary probability of being epithelial, and added nuclei to the trunk in either direction, ensuring that added nuclei were close together, formed a relatively straight line, and had similar unary probabilities, orientation, and size, where parameters for close, straight, and similar were determined empirically. Once no more nuclei can be added while remaining within the restraints specified by the parameters, all remaining nuclei can be added iteratively onto branches, where each nucleus can be simply attached with a branch to its closest neighbor already on the tree. This trunk/branch model tends to place epithelial cells on the initial trunk, and any other chains of epithelial form branches of the tree. Thus, most nuclei pairs within the same architectural-category are of the same type: nuclei pairs on trunks tend to be epithelial, nuclei pairs at junctures between branches or the trunk and a branch tend to contain mixed nuclei, and nuclei pairs on branches are often either both non-epithelial or both epithelial. This architectural layout largely removes the randomness of individual nuclei pairs that handicapped the classification of pairwise features, when applied to arbitrary nuclei pairs. To determine cell boundaries, a Canny Edge Detector was used, with a Gaussian smoothing factor selected to be 20 μm, representing twice the length of a nucleus (in various embodiments, greater or lesser values can be used, e.g., when different nuclei sizes are involved). Long, smooth edges representing cell boundaries were formed by first connecting nearby edges with similar slopes at their termini, and then removing short edges. Parameters for short edges, nearby edges, and similar slopes were determined empirically on the training set.

For each of these eight classes, a classifier function was trained using AdaBoost on the initial set of $n_p$ pairwise features. Specifically, for each architecture-category c∈C, the conditional probabilities were learned that a nucleus is epithelial, given that its neighbor is epithelial ($\Psi_e^c: (\vec{x}, \vec{y}) \in \mathbb{R}^{n_p} \times \mathbb{R}^{n_p} \to [0,1] \subset \mathbb{R}$) and the probability that a nucleus is epithelial, given that its neighbor is non-epithelial ($\Psi_n^c: (\vec{x}, \vec{y}) \in \mathbb{R}^{n_p} \times \mathbb{R}^{n_p} \to [0,1] \subset \mathbb{R}$). Here, e denotes epithelial, n denotes non-epithelial, and the probabilities are symmetric ($\Psi_n^c(\vec{x}, \vec{y}) = \Psi_e^c(\vec{x}, \vec{y})$) for the pair of nuclei (x, y) with feature vectors $\vec{x}, \vec{y} \in \mathbb{R}^{n_p}$, analogous for $\Psi_n^c$.

Conditional Markov Random Field:

Maximization on a conditional random field yields an optimal class labeling (as epithelial or non-epithelial) for the putative nuclei in an image according to that field. Note that the term "putative nuclei" is still carried because some regions assigned to the non-epithelial class may not be nuclei at all; the algorithm only seeks to classify these regions as not being epithelial, regardless of whether or not they are nuclei. An undirected graph was built in which each putative nucleus was a node, and edges placed between nearby nuclei, as defined in the previous section. Let N denote the number of nodes (nuclei) in the graph, E denote the set of epithelial nuclei, and $\bar{E}$ denote the set of nonepithelial nuclei. The edge between nodes x and y, belonging to architectural-category c, with feature vectors $\vec{x}$ and $\vec{y}$, can be weighted with the pairwise conditional probability matrix $$\begin{pmatrix} P(x \in E \mid y \in E) & P(x \in E \mid y \in \bar{E}) \\ P(x \in \bar{E} \mid y \in E) & P(x \in \bar{E} \mid y \in \bar{E}) \end{pmatrix} = \begin{pmatrix} \Psi_e^c(\vec{x}, \vec{y}) & \Psi_n^c(\vec{x}, \vec{y}) \\ 1 - \Psi_e^c(\vec{x}, \vec{y}) & 1 - \Psi_n^c(\vec{x}, \vec{y}) \end{pmatrix},$$

for architectural class c=c(x, y)∈C. Each node x is also attached a pair of unary probabilities $(P(x \in E), P(x \in \bar{E}))^T = (\psi(\vec{x}_i), 1-\psi(\vec{x}_i))^T$. The pairwise probability matrices are assembled for all nuclei pairs into the (2N×2N) binary probability matrix B, and the (2N×1) unary probability vector $\vec{u}$. Let ω be a scalar factor determining the weight of the pairwise term in the optimization problem. Then, $\max_{\vec{v}} \vec{u}^T \vec{v} + \omega \vec{v}^T B \vec{v}$ is solved, where $\vec{v}$ is a vector of N concatenated (2×1) vectors $\vec{v}_i$ such that $\|v_i\|_1 = 1$, $\forall i$. A two-phase algorithm is adapted, which finds the optimal solution to this problem by first finding a global solution to a related problem in which the constraint $\|v_i\|_1 = 1$, $\forall i$ is relaxed, then projecting the solution into the space of binary, unit-norm $v_i$'s, and finally finding a local solution in the space of binary, unit-norm $v_i$'s. As the labeling that maximizes the unary probabilities, $v^U$, already tends to be close to the ground truth, this process can be condensed by performing local optimization directly, using $v^U$ as a starting point. The algorithm is:

(0) Initialize t=0, $\vec{v}_t = \vec{v}^U$, $score_t = \vec{u}^T \vec{v}_t + \omega v_t^T B v_t$, $score_{t+1} = score_t + 2\epsilon$.

(1) While $|score_t - score_{t+1}| > \epsilon$
  (i) $t = t+1$
  (ii) $\vec{v}_t = \omega B \vec{v}_{t-1} + \vec{u}$
  (iii) Normalize $\vec{v}$ on each node i such that $\|\vec{v}_i\|_1 = 1$.
  (iv) $score_t = \vec{u}^T \vec{v}_t + \omega \vec{v}_t^T B \vec{v}_t$ This method is a variant of the power iteration for finding the first eigenpair of a matrix and will converge. As the starting point is usually very close to the optimal solution, the convergence is usually rapid.

Correcting for Isolated Epithelial Nuclei with a Local Smoothing Factor:

If one nuclei in a pair of non-epithelial nuclei has very different features than its neighbor, then the probability that this nuclei is epithelial, conditioned on its neighbor being non-epithelial, can be higher than the probability that both nuclei are non-epithelial, since the probabilities are trained to assign very different neighboring nuclei to different classes. In most cases, the unary probability that this nucleus is non-epithelial is strong enough to overpower the pairwise probability that it is epithelial, and the nucleus is correctly labeled as non-epithelial. However, if the nucleus is in a group of non-epithelial nuclei, and is very different than its neighbors, then the combined pairwise probabilities from all the neighbors that the nucleus is epithelial may outweigh the unary probability that that nucleus is nonepithelial, and the nucleus will be labeled as epithelial. To adjust for this, instead of a single smoothing factor $\lambda$; $\lambda$ can be scaled for each node according to its number of neighbors, specifically: $\lambda_j := d(j)$; where $d(j)$ is the degree of node j. Results provided herein show how a local smoothing factor improves the MRF. Additionally, the classification accuracy can be further improved by following the MRF with a correction step, in which isolated nuclei labeled as epithelial nuclei can be reassigned a label according to their maximal unary probability, as seen in Table 1:

TABLE 1

|  | Training | | | Testing | | |
| --- | --- | --- | --- | --- | --- | --- |
|  | FPR | TPR | accuracy | FPR | TPR | accuracy |
| MRF, sc. λ | 6.7 | 89.2 | 91.6 | 10.4 | 82.5 | 86.7 |
| MRF, loc. λ | 8.3 | 88.6 | 90.4 | 11.6 | 84.0 | 86.6 |
| MRF, sc. λ + corr. | 6.6 | 89.2 | 91.7 | 10.2 | 82.5 | 86.8 |
| MRF, loc. λ + corr. | 5.4 | 88.2 | 92.0 | 8.9 | 80.9 | 87.0 |

Choice of Pairwise Classifiers and Parameters:

To determine the most appropriate method for epithelial nuclei detection, a range of pairwise classifiers were sampled with a range of smoothing parameters. That is, for the problem $$\max_v \vec{u}^T v + \omega \vec{v}^T B \vec{v},$$

B and ω were varied, as well as the degree of connectivity. All combinations of the following cases were sampled: (1) as an alternative to pairwise classification functions $\Psi^c(\vec{x}, \vec{y})$ dependent on both feature vectors and the architecture-category c of each nuclei-pair, fixed pairwise classification probabilities dependent on solely the architecture-category of the pair were employed; (2) both local and scalar smoothing factors ω were employed; (3) results with and without the correction step for isolated epithelial nuclei were computed; (4) edges between only nuclei connected along the computed nuclei tree were considered, versus edges between all spatially nearby nuclei; and (5) two methods for predicting the nucleus tree were considered.

Additionally, as the architecture-category of each nucleus pair was predicted using a greedy algorithm designed to model nuclei as a trunk with branches and a Canny edge detector to estimate cell boundaries, which may be imperfect, the ground-truth architecture-category of each nucleus pair was computed in terms of the nucleus trunk, the cell boundaries, or both. For these "ideal" cases, each of the above classification functions was also sampled over a range of smoothing parameters, to determine how well the algorithm would perform if these intermediate values were perfect.

The accuracy of each method was computed on the testing data set for a large range of smoothing parameters ω. For each method that improved the accuracy by at least 1% over the accuracy with only the unary probabilities for some ω, a subset of ω's close to that method's optimal ω were selected, and the performance of the method was evaluated on a random validation set (83 images randomly selected from the combined training/testing sets). The method with the highest accuracy on the validation set as was selected as the classifier, together with the optimal ω for that method on the validation set. (Note that the results shown on the testing set need not be greater than 1% over the unary classifier, as ω was first optimized on the validation set, and so a different ω may be used for the overall results than was initially used to select methods to test on the validation set.) This classification method was then used to predict epithelial nuclei on the experimental set, as discussed in the results below.

Data

As part of the spatial-domain low-coherence quantitative phase microscopy (SL-QPM, as described in pending U.S. patent application Ser. No. 13/695,230, the entirety of which is incorporated herein by reference) protocol used to obtain results, each tissue sample was imaged at 1004 wavelengths, yielding 1004 separate images for a single sample. The average of these 1004 images was used for nuclei segmentation and classification, and the average image was referred to simply as the image. The learning data consisted of 414 stained histology images at 20× magnification (0.5 μm per pixel) from healthy (BE-normal) tissue taken from 89 patients, with each patient yielding four to five images. The average image size in the database was (531×363) pixels, or 266 μm×182 μm, with image size ranging between 32770 and 359840 pixels. From this data set, 47 patients (215 images) were diagnosed with Barrett's Esophagus, no dysplasia [BE-normal], 28 patients (131 images) were diagnosed with Barrett's Esophagus and High Grade Dysplasia [BE-HGD], and 14 patients (68 images) were diagnosed with Barrett's Esophagus and Esophageal Adenocarcinoma [BE-EAC].

In addition to the 414 images from the learning set used to train and test the nuclei segmentation and epithelial classification algorithms, a set of 424 stained histology images of the same magnification and in the same size range was obtained, for which phase information was calculated using SL-QPM to evaluate the usage of SL-QPM for early cancer detection in Barrett's Esophagus. Images in this "experimental set" came from the same set of patients as the training set, with diagnoses of BE-normal, BE-HGD, and BE-EAC, and again contained only healthy (BE-normal) tissue.

Importantly, while the images come from patients of three diagnostic classes, the tissue selected for imaging was in all cases healthy BE, with no dysplasia. It should not be apparent, even to an expert, that any of the tissue samples actually come from patients with an increased risk of cancer over BE-normal patients, as the experiment studied cell changes in the field adjacent to carcinoma.

Ground Truth:

Nuclei Segmentation: Ground truth labeling of nuclei boundaries was performed using a matlab GUI designed for the task to label nuclei boundaries, and verified/edited by a pathologist on a random sample of 10 BE-normal images, 10 BE-HGD images, and 10 BE-EAC images. Epithelial Classification: On a subset of 38 images from the same set of 89 patients, but unique from the learning and experimental sets, image regions were marked by the pathologist as belonging to epithelial cells, stromal cells, inflammatory cells, goblet cells, lymphocytes, other non-epithelial cells, or lumen. The 414 image set was then labeled accordingly and verified/edited by the pathologist. For the 424 image set, nuclei boundaries were automatically predicted using phase one of our algorithm, and then putative nuclei were labeled as epithelial or non-epithelial.

Evaluation:

The nuclei segmentation and epithelial classification methods of the subject innovation were evaluated according to true positive rate (TPR), false positive rate (FPR), and accuracy. For epithelial classification, the TPR was defined as the percent of nuclei with ground-truth label epithelial that were also predicted to be epithelial. The FPR was the percent of nuclei with ground-truth label non-epithelial that were predicted to be epithelial. The accuracy was defined as the total number of correctly classified putative nuclei, divided by the total number of putative nuclei. For nuclei segmentation, a true positive was defined as any predicted nucleus that overlapped with a ground-truth nucleus, a false positive as any predicted nucleus that did not overlap with any ground-truth nuclei, and a false negative as any ground-truth nucleus that did not overlap with any predicted nuclei. The total number of true nuclei was the number of ground-truth nuclei, and the total number of false nuclei was the number of false positives. As the definition of true positive was very weak, in that one pixel overlap was required for a putative nucleus to be considered correct, two additional measures were required to establish the quality of the predictions while tuning the nuclei segmentation algorithm. The %-covered measures the number of pixels shared by the putative nucleus and its corresponding ground-truth nucleus, divided by the total number of pixels in the ground-truth nucleus. The %-wasted measures the number of pixels from the putative nucleus that are not also in its corresponding ground-truth nucleus, divided by the total number of pixels in the putative nucleus.

Results

Automated Selection of Epithelial Nuclei

Nuclei Segmentation:

Nuclei segmentation methodology and parameters were optimized on an independent data set of 38 images, taken from a subset of the same 89 patients, but not included in the 414 image set. To establish the accuracy of the method, nuclei were hand-segmented on a validation set of 30 images from the 414 image data set, ten from each of the three diagnostic classes. Initial hand-segmentation was later corrected/verified by the pathologist.

Figure 4:
FIG. 4 illustrates manual and automatic segmentation for a sample image.

The overall segmentation accuracy on the 30 images is shown in Table 2, below, along with the performance on each diagnostic class. There was little variation in segmentation accuracy between classes, which was to be expected since the images all showed healthy tissue. A representative ground-truth hand-segmentation and computational nucleus segmentation is shown in FIG. 4; the example of FIG. 4 has a 94% TPR and a 33% FPR.

TABLE 2

|  | Number images | TPR (%) | FPR (%) |
| --- | --- | --- | --- |
| Overall | 30 | 94 | 33 |
| BE-normal | 10 | 96 | 34 |
| BE-HGD | 10 | 94 | 29 |
| BE-EAC | 10 | 94 | 36 |

Figure 5:
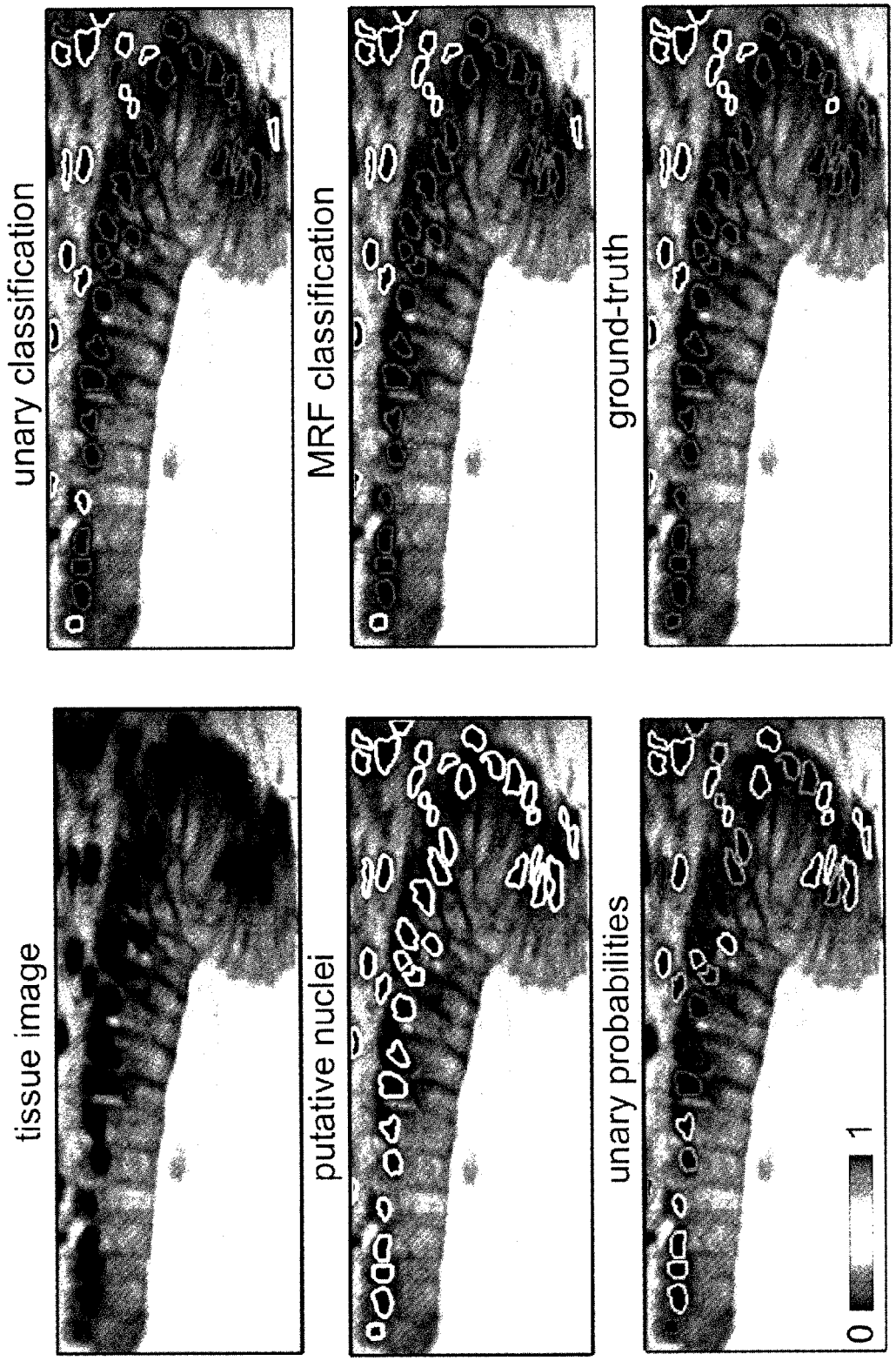
FIG. 5 illustrates epithelial classification in accordance with aspects of the subject innovation.

Epithelial Classification:

The images were randomly split into a training set of 331 images (80%) and a testing set of 83 images (20%). To validate the epithelial classification, all putative nuclei were initially labeled as epithelial or non-epithelial on all 414 images, and then corrected/verified by the pathologist. Parameters for both unary and pairwise classifiers were learned on the training set. Table 3, below, shows the epithelial classification results using (a) only the unary classifier, and (b) both unary and pairwise classifiers, on both the training and testing sets Improvement in both increased true positive rate [TPR] and decreased false positive rate [FPR] were observed with the addition of the pairwise classifier. FIG. 5 shows an example of improvement in accuracy of epithelial classification through addition of context information encoded in the MRF. For the initial image (top) with ground-truth nuclei labeling shown on the bottom (red=epithelial cell nuclei, white=other nuclei), putative nuclei were predicted in Phase I, as shown in row 2. The unary probability of these nuclei being epithelial is shown in the third row, and all nuclei with unary probability greater than 0.5 could be classified as epithelial, as in row 4 (in various embodiments, other threshold values could be used). By using contextual information encoded in a MRF, the classification improves, as seen in row 5.

TABLE 3

|  | Training | | | Testing | | |
| --- | --- | --- | --- | --- | --- | --- |
|  | FPR | TPR | accuracy | FPR | TPR | accuracy |
| Unary | 10.9 | 87.3 | 88.3 | 13.3 | 84.0 | 85.7 |
| cMRF | 8.4 | 89.5 | 92.0 | 10.9 | 85.6 | 87.0 |

On a 2012 MacBook Pro (2.9 GHz Intel Core i7, 8 GB memory), as used in experimental analysis discussed herein, initial nuclei segmentation took approximately 120 seconds for an average sized pixel image. The epithelial classification took around 60 seconds, thus the algorithm spent an average of approximately 180 seconds per image. By running the algorithm overnight, significant time was saved over the several minutes required for a researcher to manually outline each epithelial nucleus in an image.

Automated Versus Manual Selection:

On the experimental data set of 424 images, an independent researcher, generated putative nuclei using the above nuclei segmentation algorithm and manually selected around 10 epithelial nuclei from the set of putative nuclei from each image for phase analysis. Overall, 4095 nuclei were manually selected, while 7045 nuclei were automatically selected. For 3224 of the manually selected nuclei (78.7%), an automatically selected nucleus shared at least half of its pixels. For 80.1% of the manually selected nuclei, an automatically selected nucleus overlapped by at least one pixel. Note that many more nuclei were expected to be selected automatically than manually, as the algorithm seeks every epithelial nuclei, while the independent researcher only sought around 10 representative nuclei per image. The automated algorithm tended to miss epithelial nuclei that were isolated, as the pairwise nature of the algorithm encourages epithelial nuclei to appear in chains.

Optical Biomarker for Cancer Risk in BE

The below discussion demonstrates that (a) automatically selecting nuclei can produce an equivalent or larger set of epithelial nuclei as manually selecting nuclei, and (b) distributions of features computed on the phase of epithelial cells can be used as an optical biomarker for cancer risk in BE. When computing phase on the predicted epithelial nuclei, nuclei on image boundaries were ignored, as the pixel intensities near the boundaries were generally much darker than in the image interiors do to intensity fall-off.

Figure 6:
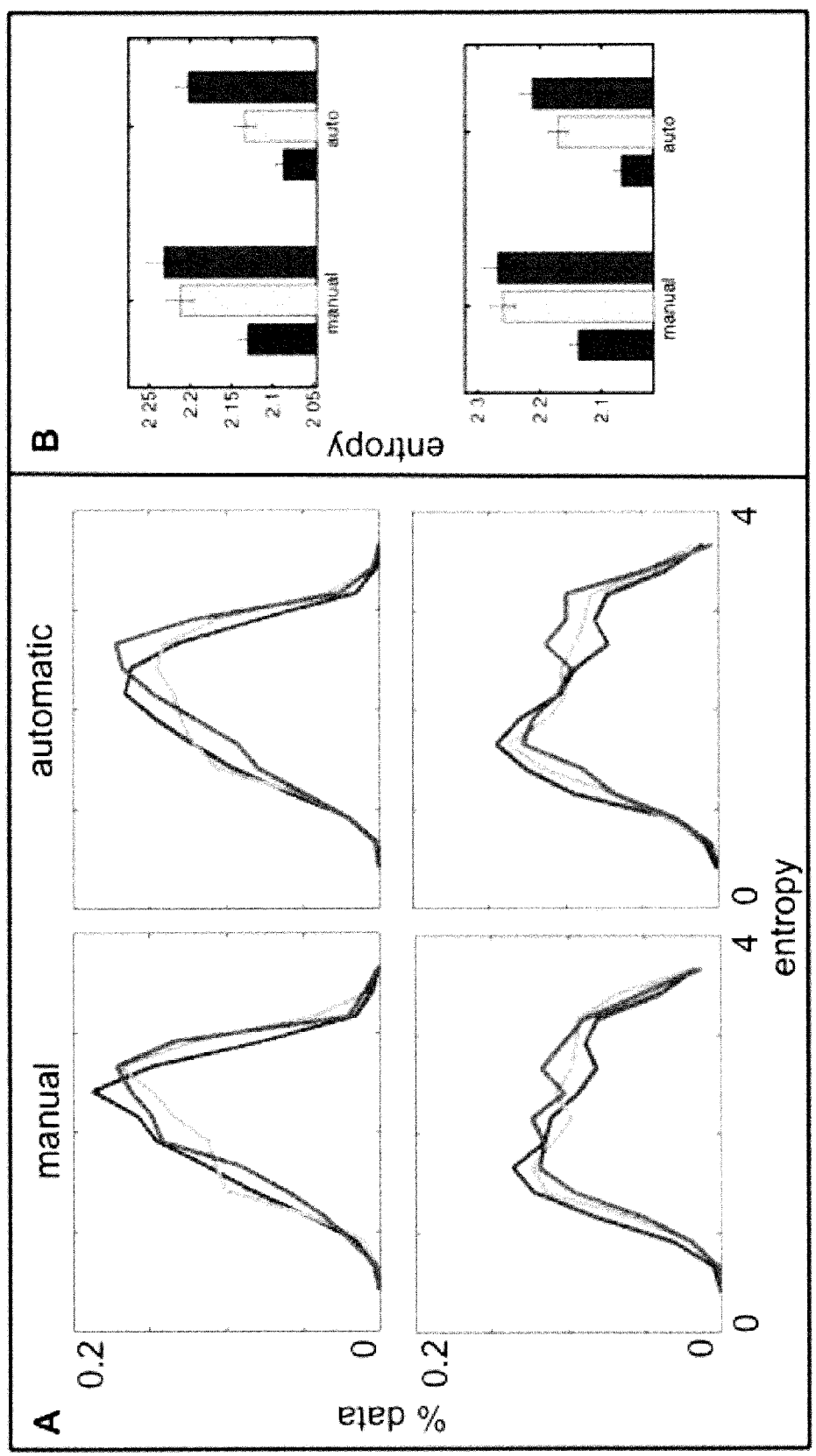
FIG. 6 illustrates entropy distributions on nuclei and means for diagnostic classes used in connection with results discussed herein.

An average nucleus has approximately 800 pixels, and phase was computed on every pixel in every epithelial nucleus. To summarize the distribution of phases on a nucleus, the entropy was computed as $H^b = -\Sigma_b p_b \log(p_b)$, where b indicated a binning index. In the experimental results discussed herein, 51 bins of length $$\frac{\pi}{25}$$

to discretize the phase at each pixel. Additionally, the following distributions were analyzed: (1) mean phase on each nucleus, (2), mean standard deviation on each nucleus, (3) mean nucleus phase on each image, (4) mean amplitude on each nucleus, and (5) nuclei pixel phases, across each diagnostic set, and each measure was found to have statistical significance for differentiating the diagnostic classes. In FIG. 6, showing entropy distributions on nuclei and means for diagnostic classes used in connection with results discussed herein, it can be seen that the phase entropy within nuclei increased as the diagnostic class worsens from BE-normal to BE-HGD to BE-EAC, for depths 1-2. For depths 3-4, the entropy decreased along this same pathway (not shown). FIG. 6A shows the entropy distribution on nuclei at depths 1 (top row) and 2 (bottom row), using manual or automatic selection. FIG. 6B shows the mean, where error bars indicate standard error, for each diagnostic class, using manual or automatic selection. Blue indicates healthy tissue, green indicates HGD-adjacent tissue, and red indicates EAC-adjacent tissue.

Results provided in Table 4 show that the p-values describing the probability that the entropy distributions from any pair of diagnostic classes were generated from the same distribution in Table 3 for both automatically and manually selected nuclei. Given a cutoff for significance of p-value<0:05, both the manual and automatic nuclei have significantly different distributions for each diagnostic class in at least one, and almost all, phase depths. The HGD and EAC classes were hardest to separate, while the BE-EAC classes were easiest to separate.

TABLE 4

| depth | BE-HGD | HGD-EAC | BE-HGD |
|---|---|---|---|
| | Manual | | |
| 1 | 0.0000 | 0.4719 | 0.0000 |
| 2 | 0.0000 | 0.8209 | 0.0000 |
| 3 | 0.0006 | 0.0009 | 0.0000 |
| 4 | 0.0219 | 0.0001 | 0.0000 |
| | Automatic | | |
| 1 | 0.0017 | 0.0009 | 0.0000 |
| 2 | 0.0000 | 0.0954 | 0.0000 |
| 3 | 0.0000 | 0.0003 | 0.0000 |
| 4 | 0.0001 | 0.0005 | 0.0000 |

Table 5, below, shows the results on validation, training, and testing set for the best performing classifiers (any binary classifier that improved accuracy on testing set by more than 1% over unary classifier. Columns 1-5 describe the parameters used for each binary classifier.). The final two rows show results with only the unary classifier.

TABLE 5

| method | | | | | Validation set results | | | Overall Results | |
|---|---|---|---|---|---|---|---|---|---|
| tree | correction? | $\Psi_c$ | $\lambda$ | edges | FPR | TPR | acc. | Training acc. | Testing acc. |
| angle/dist. | y | f | $\vec{\lambda}$ | spatial | 5.2 | 87.6 | 91.9 | 92.0 | 87.0 |
| angle/dist. | y | f | $\lambda$ | spatial | 6.5 | 88.0 | 91.3 | 91.7 | 86.8 |
| angle/dist. | | f | $\lambda$ | spatial | 6.6 | 88.1 | 91.2 | 91.6 | 86.7 |
| dist. | y | f | $\vec{\lambda}$ | spatial | 8.1 | 88.8 | 90.7 | 90.8 | 87.7 |
| dist. | | f | $\vec{\lambda}$ | spatial | 8.4 | 89.2 | 90.6 | 90.6 | 87.4 |
| dist. | | f | $\lambda$ | spatial | 8.2 | 88.7 | 90.5 | 90.6 | 86.9 |
| dist. | y | f | $\lambda$ | spatial | 8.1 | 88.4 | 88.2 | | 86.6 |
| dist. | y | f | $\vec{\lambda}$ | tree | 8.8 | 89.5 | 88.4 | | 87.1 |
| dist. | y | f | $\lambda$ | tree | 9.0 | 89.6 | 88.4 | | 87.1 |
| dist. | | f | $\lambda$ | tree | 9.2 | 89.7 | 88.3 | | 86.8 |
| dist. | | f | $\vec{\lambda}$ | tree | 10.6 | 89.3 | 89.4 | | 86.8 |
| dist. | y | l | $\lambda$ | tree | 9.3 | 87.3 | 86.9 | | 86.8 |
| dist. | | l | $\lambda$ | tree | 9.4 | 87.3 | 86.8 | | 86.8 |
| unary classifier, angle/dist. | | | | | 10.9 | 88.4 | 88.8 | 88.3 | 85.7 |
| unary classifier, dist. | | | | | 11.2 | 88.6 | 88.7 | 88.3 | 85.8 |

Table 6, below, shows true and false positive rates on training and testing sets for the 25 most predictive unary features. The bottom row shows the FPR and TPR for the combined classifier generated with AdaBoost. Each training set consisted of around 15387 nuclei from 332 images, and each testing set consisted of around 3935 nuclei from 882 images. In total, there were 11459 ground-truth non-epithelial putative nuclei and 7863 ground-truth epithelial nuclei. For canny edge features, a indicates the size of the Gaussian filter used for smoothing. Note that these results are for the combined nuclei set taken from all images—a single image can yield both training and testing nuclei. As epithelial classification depends on neighboring nuclei, entire images were labeled as either testing or training for validating epithelial segmentation. Thus, the overall training and testing accuracy in Table 6 will be slightly different than the accuracy shown for the unary classifier above.

TABLE 6

| Feature | Training | | Testing | |
|---|---|---|---|---|
| | FPR | TPR | FPR | TPR |
| median pixel intensity | 28.4 | 90.1 | 32.1 | 88.7 |
| Area | 26.8 | 77.1 | 26.9 | 75.3 |
| mean-nuc-back | 31.9 | 76.3 | 34.3 | 76.7 |
| med-nuc-back | 40.3 | 91 | 43.5 | 91 |
| $\chi_2$-distance between nucleus and surrounding intensities | 36.3 | 71.1 | 34.5 | 69.1 |
| average length of closest canny edge, $\sigma = 20$ | 33.6 | 59.9 | 36.8 | 67.8 |
| distance to closest cell boundary | 36.9 | 66.1 | 37.8 | 65.1 |
| shared-edges-double-20 | 34.3 | 60.5 | 39.3 | 66.8 |
| average length of closest canny edge, $\sigma = 25$ | 42.8 | 69.4 | 44.7 | 73.5 |
| shared-edges-single-20 | 36.8 | 60.9 | 38.3 | 64.6 |
| length of second closest canny edge, $\sigma = 20$ | 33.2 | 54.2 | 34.7 | 60.7 |
| distance to second closest canny edge, $\sigma = 30$ | 38 | 61.3 | 38.7 | 64.4 |
| length of first closest canny edge, $\sigma = 25$ | 38.5 | 58.9 | 38.7 | 63.2 |
| shared-edges-single-25 | 47.1 | 70.8 | 46.1 | 72.8 |
| average length of closest canny edge, $\sigma = 15$ | 36.4 | 59.9 | 38.4 | 62.5 |
| -avg-dist-to-two-edges-sig-30 | 43.4 | 67.7 | 44.6 | 69.8 |
| average distance to closest two cell boundaries | 27.8 | 51.7 | 30.9 | 55.8 |
| mean-neigh-orien-diff | 42.9 | 65.1 | 39.6 | 63.3 |
| average distance to two closest canny edges, $\sigma = 25$ | 36.8 | 59.3 | 38.1 | 61.2 |
| distance to second closest canny edge, $\sigma = 45$ | 38.6 | 59.7 | 38.8 | 61.5 |
| length of second closest canny edge, $\sigma = 15$ | 38.4 | 58.2 | 39.3 | 61.8 |
| avg-length-edge-sig-30 | 33.5 | 57.8 | 35 | 57.8 |
| average distance to two closest canny edges, $\sigma = 45$ | 41.8 | 62.5 | 40.4 | 62.7 |
| angle to closest cell boundary | 39.3 | 58.7 | 40.8 | 63.1 |
| distance to second closest canny edge, $\sigma = 25$ | 34.7 | 57 | 36.5 | 58.6 |
| combined features (AdaBoost) | 12.9 | 88.6 | 13.8 | 88.2 |

Figure 7:
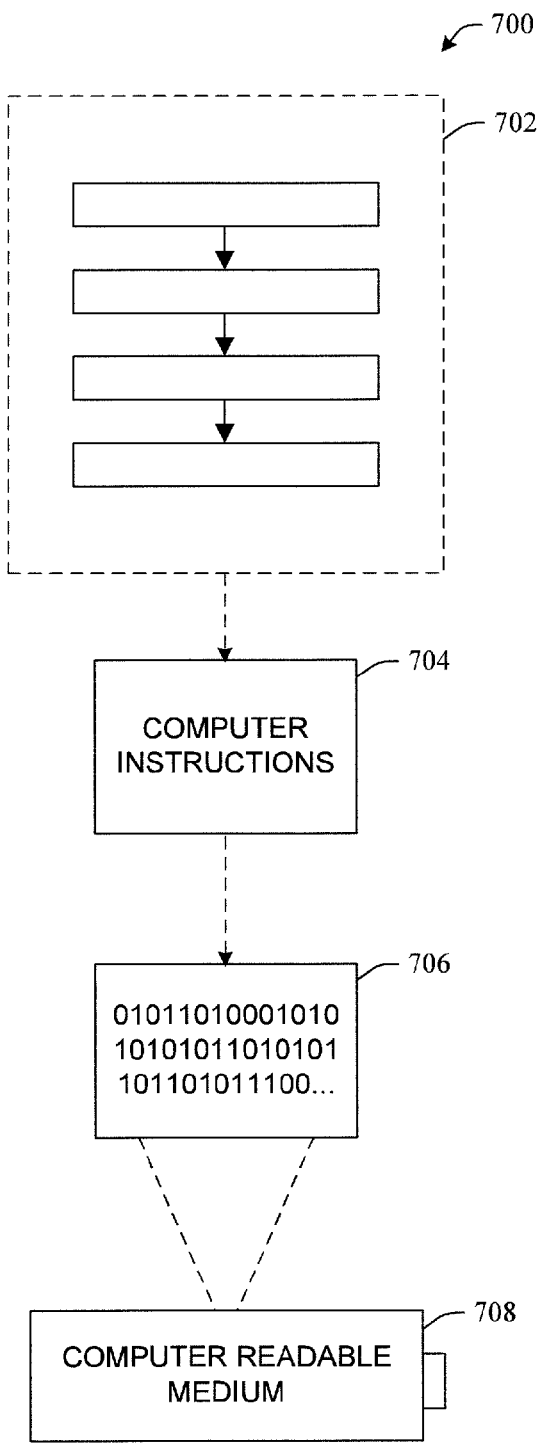
FIG. 7 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 7, wherein an implementation 700 comprises a computer-readable medium 708, such as a CD-R, DVD-R, flash drive, a platter of a hard disk drive, etc., on which is encoded computer-readable data 706. This computer-readable data 706, such as binary data comprising a plurality of zero's and one's as shown in 706, in turn comprises a set of computer instructions 704 configured to operate according to one or more of the principles set forth herein. In one such embodiment 700, the processor-executable computer instructions 704 is configured to perform a method 702, such as at least a portion of one or more of the methods described in connection with embodiments disclosed herein. In another embodiment, the processor-executable instructions 704 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 8:
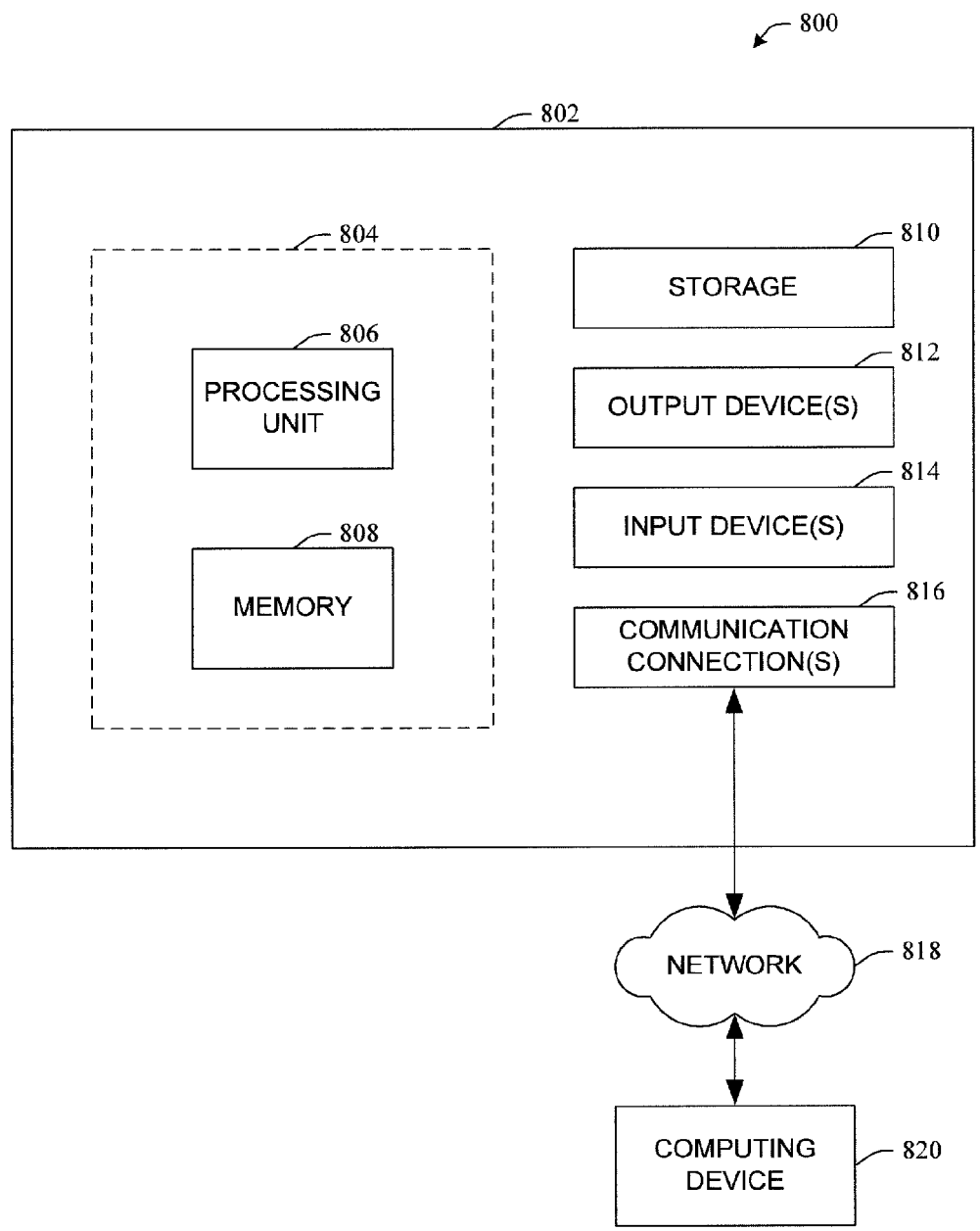
FIG. 8 illustrates a computing environment where one or more of the provisions set forth herein can be implemented, according to some embodiments.

FIG. 8 and the following discussion provide a description of a suitable computing environment in which embodiments of one or more of the provisions set forth herein can be implemented. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 8 illustrates a system 800 comprising a computing device 802 configured to implement one or more embodiments provided herein. In one configuration, computing device 802 can include at least one processing unit 806 and memory 808. Depending on the exact configuration and type of computing device, memory 808 may be volatile, such as RAM, non-volatile, such as ROM, flash memory, etc., or some combination of the two. This configuration is illustrated in FIG. 8 by dashed line 804.

In these or other embodiments, device 802 can include additional features or functionality. For example, device 802 can also include additional storage such as removable storage or non-removable storage, including, but not limited to, magnetic storage, optical storage, and the like. Such additional storage is illustrated in FIG. 8 by storage 810. In some embodiments, computer readable instructions to implement one or more embodiments provided herein are in storage 810. Storage 810 can also store other computer readable instructions to implement an operating system, an application program, and the like. Computer readable instructions can be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media can be part of device 802.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 802 can include one or more input devices 814 such as keyboard, mouse, pen, voice input device, touch input device, infrared cameras, video input devices, or any other input device. One or more output devices 812 such as one or more displays, speakers, printers, or any other output device can also be included in device 802. The one or more input devices 814 and/or one or more output devices 812 can be connected to device 802 via a wired connection, wireless connection, or any combination thereof. In some embodiments, one or more input devices or output devices from another computing device can be used as input device(s) 814 or output device(s) 812 for computing device 802. Device 802 can also include one or more communication connections 816 that can facilitate communications with one or more other devices 820 by means of a communications network 818, which can be wired, wireless, or any combination thereof, and can include ad hoc networks, intranets, the Internet, or substantially any other communications network that can allow device 802 to communicate with at least one other computing device 820.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving in a computing device an image comprising a plurality of cells;
   fitting in the computing device a Gaussian mixture model to an intensity distribution of the image, wherein the model comprises one or more Gaussian distributions and a background distribution;
   identifying in the computing device a first Gaussian component $G_g$ associated with a first Gaussian distribution of the one or more Gaussian distributions corresponding to nuclei of the plurality of cells; and
   defining in the computing device a nuclei mask as a binary matrix based at least in part on the first Gaussian component $G_g$, wherein the nuclei mask comprises one or more putative nuclei associated with the plurality of cells.

2. The method of claim 1, further comprising cleaning the nuclei mask by removing one or more of holes, isolated pixels, or bridge pixels.

3. The method of claim 1, further comprising contrast normalizing the nuclei mask.

4. The method of claim 1, further comprising removing thin lines of pixels included in the nuclei mask.

5. The method of claim 1, further comprising breaking one or more large regions of the nuclei mask into individual nuclei.

6. The method of claim 1, further comprising removing one or more very small regions from the nuclei mask.

7. The method of claim 1, further comprising expanding at least one of the one or more putative nuclei via a watershed.

8. A method, comprising:
   receiving in a computing device an image comprising a plurality of cells;
   fitting in the computing device a Gaussian mixture model to an intensity distribution of the image, wherein the model comprises one or more Gaussian distributions and a background distribution, and wherein the one or more Gaussian distributions correspond to nuclei, cytoplasm, and stroma/lumen of the plurality of cells;
   identifying in the computing device a first Gaussian component $G_g$ associated with a first Gaussian distribution of the one or more Gaussian distributions using intensities and region sizes of pixels described by one or more Gaussian components; and
   defining in the computing device a nuclei mask as a binary matrix based at least in part on the first Gaussian component $G_g$, wherein the nuclei mask comprises one or more putative nuclei associated with the plurality of cells.

9. The method of claim 8, further comprising cleaning the nuclei mask by removing one or more of holes, isolated pixels, or bridge pixels in the image.

10. The method of claim 8, further comprising contrast normalizing the nuclei mask.

11. The method of claim 8, further comprising removing thin lines of pixels included in the nuclei mask.

12. The method of claim 8, further comprising breaking one or more large regions of the nuclei mask into individual nuclei.

13. The method of claim 8, further comprising removing one or more very small regions from the nuclei mask.

14. The method of claim 8, wherein the first Gaussian component $G_g$ corresponds to the nuclei of the plurality of cells.

15. A method, comprising:
   receiving in a computing device an image comprising a plurality of cells;
   fitting in the computing device a Gaussian mixture model to an intensity distribution of the image, wherein the model comprises one or more Gaussian distributions and a background distribution;
   identifying in the computing device a first Gaussian component $G_g$ associated with a first Gaussian distribution of the one or more Gaussian distributions corresponding to nuclei of the plurality of cells using intensities and region sizes of pixels described by one or more Gaussian components; and
   defining in the computing device a nuclei mask as a binary matrix based at least in part on the first Gaussian component $G_g$, wherein the nuclei mask comprises one or more putative nuclei associated with the plurality of cells.

16. The method of claim 15, further comprising cleaning the nuclei mask by removing one or more of holes, isolated pixels, or bridge pixels.

17. The method of claim 15, further comprising contrast normalizing the nuclei mask.

18. The method of claim 15, further comprising removing thin lines of pixels included in the nuclei mask.

19. The method of claim 15, further comprising breaking one or more large regions of the nuclei mask into individual nuclei.

20. The method of claim 15, further comprising removing one or more very small regions from the nuclei mask.

* * * * *